United States Patent [19]
Stone

[11] 3,820,860
[45] June 28, 1974

[54] VARIABLE BORE CLEARANCE BEARING

[75] Inventor: Alan J. Stone, Oneoye, N.Y.

[73] Assignee: Stone Conveyor, Inc., Honeoye, N.Y.

[22] Filed: Aug. 3, 1972

[21] Appl. No.: 277,506

[52] U.S. Cl.................. 308/27, 308/54, 308/62, 308/237
[51] Int. Cl............................................ F16c 33/04
[58] Field of Search............ 308/27, 54, 237, 31, 62

[56] References Cited
UNITED STATES PATENTS

| | | | |
|---|---|---|---|
| 602,287 | 4/1898 | Green | 308/62 |
| 675,596 | 6/1901 | Green | 308/62 |
| 715,448 | 12/1902 | Wilson, Jr. | 308/27 |
| 1,278,800 | 9/1918 | Farnum | 308/62 |
| 3,007,754 | 11/1961 | Cross | 308/237 |

Primary Examiner—Charles J. Myhre
Assistant Examiner—Barry Grossman
Attorney, Agent, or Firm—Harvey B. Jacobson; Clarence A. O'Brien

[57] ABSTRACT

A bearing assembly comprising a pair of half bearing members each of generally semi-cylindrical configuration with a pair of diametrically opposite radial surfaces, a boss protruding from one of the surfaces and a similarly shaped indentation on the opposite surface, whereby the pair of bearing members may be mated together either with the boss of one of the members in the indentation of the other member, or alternatively with the bosses abutting each other to provide two bore clearance settings for accommodation of slightly different shaft diameters or to compensate for warping, wear, or expansion rates.

4 Claims, 6 Drawing Figures

PATENTED JUN 28 1974 3,820,860

VARIABLE BORE CLEARANCE BEARING

The present invention is generally related to bearings and, more particularly, to an improved hanger bearing assembly for screw conveyor applications and the like.

In recent years, it has become common practice to provide screw conveyor hanger bearings comprised of a pair of mating half bearing members which embrace the screw conveyor shaft. These bearings have been available in various sizes to accommodate different shaft diameters. Many such bearings are presently molded from plastic materials such as Nylatron and Teflon-filled-Nylon. The bearings have been made available in different sizes which vary from each other by about one half inch in diameter or so. It will be appreciated that, in many cases, the bearings do not provide a desirable fit around the shaft, one size being too tight and the next size being too loose to properly support the shaft. In addition, from a maufacturing standpoint, heretofore, it was difficult to maintain the sizes within desirable tolerances when using the same mold for different plastic materials exhibiting different coefficients of expansion. Also, it has been observed that many such plastic bearings may warp or wear with extended periods of use.

One solution to the above problems would be to provide a separate set of molds for each type of bearing material, with each set including a wide selection of sizes closely matched to the conveyor shaft sizes. From manufacturing and marketing standpoints, however, this would not be economical and would necessitate substantial price increases.

Therefore, it is an object of the present invention to provide a novel bearing assembly adapted to produce alternate bore clearances, whereby a single bearing assembly may be used in a manner to compensate for slight variations in shaft diameter.

Another object of the present invention is to provide a unique bearing assembly which may be economically molded from various materials exhibiting different coefficients of expansion, and including means for compensating for warping or wear over a period of time.

It is a further object of the present invention to provide a versatile half bearing member with bosses protruding from one edge thereof and similar indentations in the opposite edge to provide for alternate mating of two half bearing members either with the bosses of one mating either with the indentations or with the bosses of the other to define alternate bore clearances.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
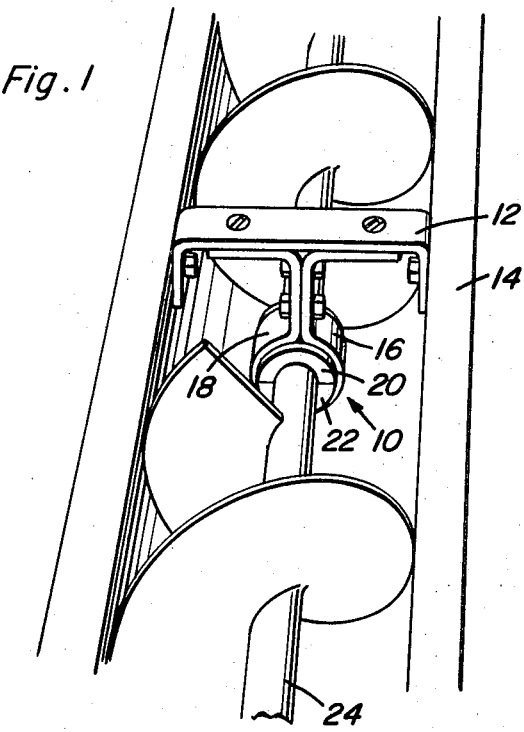
FIG. 1 is a perspective view of the bearing assembly of the present invention mounted to a typical screw conveyor shaft.
Figure 2:
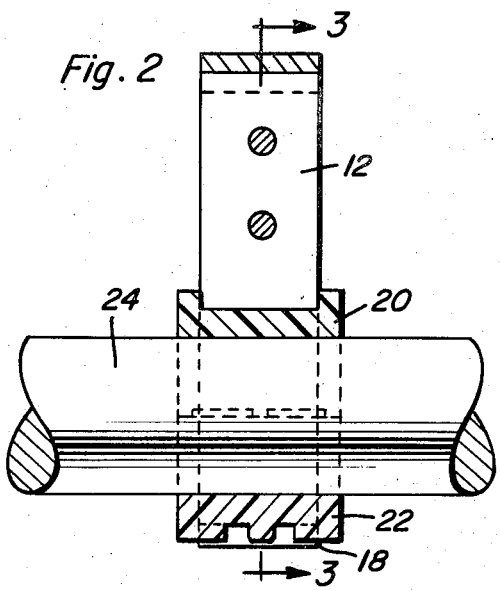
FIG. 2 is a sectional view of the bearing assembly of the present invention.
Figure 3:
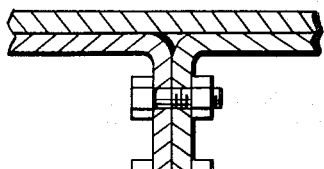
FIG. 3 is a cross-sectional view taken along section 3—3 of FIG. 2.

Referring now, more particularly, to FIGS. 1-3 of the drawings, the bearing assembly of the present invention is generally indicated by the numeral 10 and includes a mounting bracket 12 adapted to be fastened to a conventional screw conveyor framework 14. Bracket 12 includes a bifurcated support frame with arcuate portions 16 and 18 which embrace a pair of half bearing members 20 and 22. A screw conveyor shaft 24 passes through the bore defined by the half bearing members for rotation relative thereto. It is not intended that the bearing assembly of the present invention be limited to the configuration of mounting bracket illustrated. Other mounting brackets may be used, and the bearing assembly may be utilized for supporting shafts other than those of the screw conveyor type.

Figure 5:
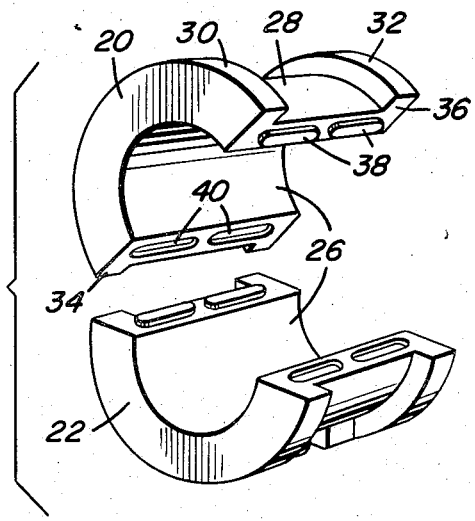
FIG. 5 is an exploded perspective view of a pair of bearing half members of the present invention.
Figure 4:
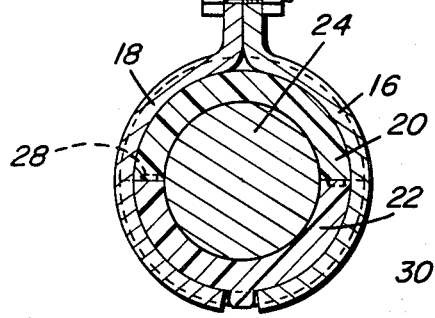
FIG. 4 is a bottom view of one of the bearing half members associated with the present invention.

With reference to FIGS. 4 and 5, it will be observed that the half bearing members are of generally semi-cylindrical configuration with inner bearing surfaces 26 adapted to embrace the rotating shaft. Arcuate portions 16 and 18 associated with the support bracket or hanger embrace the outer cylindrical surface 28 of the half bearing members when assembled. The bearing members are prevented against axial movement by way of a pair of circular flanges 30 and 32 which abut against portions 16 and 18 of the mounting bracket.

With particular reference to FIG. 5, it will be appreciated that each half bearing member is provided with a pair of diametrically opposite radial planar surfaces 34 and 36 which are adapted to face corresponding surfaces associated with the adjoining half bearing member. One of these planar surfaces is provided with a pair of bosses 38 which protrude outwardly therefrom. The opposite surface is provided with a pair of indentations 40 which are of approximately the same size and configuration as bosses 38. As such, the bearing half members may be mated or interlocked at a first bore clearance setting as best illustrated in FIG. 3. This interlocking arrangement tends to strengthen the bearing into an integral unit which is particularly desirable in applications involving higher speeds and stresses.

Figure 6:
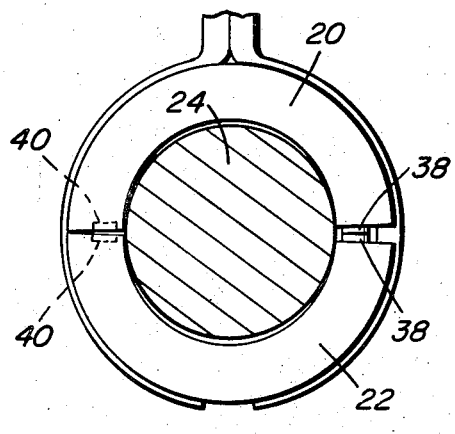
FIG. 6 is an end view of the bearing half members mounted in an alternate position.

Referring now, more particularly, to FIG. 6, it will be appreciated that the half bearing members may be assembled with the bosses of each respective member abutting those of the other. In effect, this provides for somewhat increased spacing between the adjacent members and defines an alternate or second bore clearance. This feature is highly advantageous in that it may be utilized to compensate for warp or wear of the bearing members over a period of time. In addition, the bearing members may in many cases be more closely fitted to the screw conveyor shaft upon initial installation. It should also be noted that since the bosses are easily accessible, one or the other may be readily filed or ground down to provide a closer fit of the bearing to a particular shaft or hanger bracket supporting it. This alternate assembly arrangement is also advantages compensating for slight size differences in the molded product due to expansion or shrinkage characteristics. In effect this means that the bearing assembly of the present invention may be manufactured with a minimum number of mold sizes even though the dimensions of the half bearing members may vary for different materials, these variations being compensated for by utilizing the bosses and alternate assembly arrangement. Of course, it is not intended that the half bearing members be limited to the exact configurations illustrated in the drawings, so long as the bosses and indentations are symmetrical to the cross-sectional plane extending through the half bearing members.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A bearing assembly comprising a pair of half bearing members each with semi-cylindrical inner bearing surfaces and outer surfaces adapted to be engaged by a support bracket, said inner and outer surface of each half bearing member terminating at a pair of diametrically opposite radial planar surfaces, each half bearing member including a boss protruding from one of said radial planar surfaces and an indentation formed in the opposite radial plane surface, bracket means for holding said half bearing members in engagement with each other with their respective radial planar surfaces oppositely disposed of each other, at least one of said half bearing members being selectively positionable in first and second end-to-end reversed positions relative to the other half bearing member and said bracket means, said boss being matingly received in said indentation when said one half bearing member is in said first position and said bosses being disposed in outer end surface abutting engagement with each other when said one half bearing member is in said second position, thereby spacing the corresponding radial planar surfaces apart with the inner bearing surfaces of said bearing members defining a generally cylindrical, but slightly ovate, bearing bore having major and minor diameters measured along diameters of said bearing assembly disposed at generally right angles relative to each other, the outer end surfaces of said bosses being generally flat and generally paralleling said radial planar surfaces.

2. The structure set forth in claim 1 wherein said boss and said indentation are of approximately the same size and configuration such that said boss may be received in mating engagement by said indentation.

3. The structure set forth in claim 2 wherein said bracket means includes a bifurcated portion which partially surrounds and retentively embraces said outer surfaces of said half bearing members.

4. The combination of claim 1 wherein said boss and indentation are generally oblong circular in cross-sectional shape and the major dimensions of said indentation and boss extend along said radial planar surfaces in a path paralleling the axes of curvature of the inner surfaces of said half bearing members.

* * * * *